United States Patent [19]

Carpenter et al.

[11] 4,270,165
[45] May 26, 1981

[54] CONTROLLER FOR D.C. CURRENT SUPPLIED BY A PLURALITY OF PARALLEL POWER SUPPLIES

[75] Inventors: Ronnie L. Carpenter, San Diego; Frank Cathell, Chula Vista, both of Calif.

[73] Assignee: Qualidyne Systems, Inc., Chula Vista, Calif.

[21] Appl. No.: 32,857

[22] Filed: Apr. 24, 1979

[51] Int. Cl.³ ............................................. H02M 3/24
[52] U.S. Cl. ...................................... 363/65; 307/82; 307/58
[58] Field of Search ...................... 307/58, 82; 363/65, 363/70, 124

[56] References Cited

U.S. PATENT DOCUMENTS

| | | |
|---|---|---|
| 3,001,082 | 9/1961 | Clarke . |
| 3,515,974 | 6/1970 | Stich . |
| 3,621,365 | 11/1971 | Beck et al. . |
| 3,675,037 | 7/1972 | Hamilton . |
| 3,818,307 | 6/1974 | Hamilton et al. . |
| 3,916,283 | 10/1975 | Burrows . |
| 3,947,747 | 3/1976 | Smith . |
| 4,039,925 | 8/1977 | Fletcher et al. . |
| 4,062,057 | 12/1977 | Perkins et al. . |

Primary Examiner—William M. Shoop
Attorney, Agent, or Firm—Lowe, King, Price & Becker

[57] ABSTRACT

A plurality of conventional, parallel a.c. to d.c. to a.c. to d.c. converters are driven by a common a.c. source supply current to a common load. Each of the converters includes a controller for a pulse width modulated chopper; the controller determines the amplitude of d.c. current at the output terminals of the particular converter. Input terminals of each controller are responsive to the output voltage of the particular converter with which the controller is associated. A common controller for the controllers of the individual converters is responsive to the load voltage. The common controller varies the impedance of a single variable impedance connected in parallel to remote sense input terminals of the controller of each of the converters.

25 Claims, 2 Drawing Figures

CONTROLLER FOR D.C. CURRENT SUPPLIED BY A PLURALITY OF PARALLEL POWER SUPPLIES

TECHNICAL FIELD

The present invention relates generally to parallel d.c. power supplies for a single load, and more particularly, to a circuit for controlling the d.c. current supplied by each of the parallel power supplies.

BACKGROUND ART

One type of conventional power supply for activating a d.c. load includes an a.c. to d.c. to a.c. to d.c. converter energized by an a.c. power source. The first a.c. to d.c. conversion is performed by a full wave rectifier directly responsive to the a.c. power source and which drives a filter circuit to derive a d.c. voltage. The filtered d.c. voltage is applied to a variable pulse width chopper which is activated at a relatively high frequency compared to the frequency of the a.c. power supply; for example, the chopper is activated at a frequency of 20 Hz, while the a.c. power supply typically has a frequency of 60 Hz. The relatively high frequency output of the chopper is applied to a second full wave rectifier and filter having output terminals that are connected to a load via a suitable cable. The voltage at the output terminals of the second full wave rectifier and filter is applied as a control input to a controller for the pulse width of the chopper. By controlling the width of pulses derived from the chopper, the amplitudes of the output current and voltage of the second full wave rectifier and filter are controlled. The controller includes a pair of "remote sense input terminals" which, when connected directly to the load, cause the controller to respond to the load voltage so the voltage applied to the controller by the output terminals of the second full wave rectifier and filter has virtually no effect on the controller.

Typically, such power supplies are capable of delivering approximately 500 watts to a load, such that 100 amperes are supplied to the load at a voltage of 5 volts. For many applications, e.g., large computers having extensive semiconductor memories and a large amount of calculating circuitry, the necessary power can be supplied only by a number of parallel a.c. to d.c. to a.c. to d.c. converters. This is because modern a.c. to d.c. to a.c. to d.c. converters employ choppers utilizing bipolar transistors having limited current capacity.

In the past, several different systems including switched or chopped a.c. to d.c. to a.c. to d.c. converters have been devised. These systems are generally referred to as master-slave, constant current paralleling, and straight paralleling. Each of these prior art systems has at least one disadvantage.

In the master-slave systems, one power supply or converter is selected to sense and control the output voltage of each of the remaining supplies, which are slaved to track or follow the master supply. The master-slave systems involve relatively complex interconnections for logic signals derived from the master to all of the slave units. Although the master-slave system works well and the supplies equally share the current supplied to the load, if the converters are properly designed, the reliability of the system is only as good as the master converter. The entire system fails when the master converter fails; failures of the master may have disastrous consequences to the load.

In the constant current parallel systems, current limiting circuits in the power supplies or converters are operated in the constant current mode. Hence, if a given supply is overloaded, that supply becomes a constant current source for the load as the output of voltage of the particular supply drops. Because of this requirement, the output voltages of all supplies, except one, are adjusted to be a few millivolts higher than the deisred nominal load voltages.

The supplies having the higher output voltages are designed to become equal current sources, while the supply with the lowest output voltage becomes a voltage regulator. The number of constant current supplies is thereby dependent on the load requirements. However, the supplies are not capable of delivering exactly equal currents to the load. Because there is no actual current sharing amongst the "constant current" sources, there is unequal power dissipation in the different constant current power supplies. Thereby, the reliability of the units supplying most of the current is significantly reduced. In addition, the constant current paralleling systems generally produce inferior voltage regulation than the master-slave and straight parallel systems. In certain instances, the voltage regulation requirements for the load exceed the capability of a system employing constant current paralleling.

In the straight parallel systems, the power supplies or converters are directly connected in parallel with equal length cables from each supply output terminal to a common load point. To operate effectively, all supplies must be adjusted so that the output voltages thereof are exactly the same. It has been found, in fact, that it is virtually impossible to adjust the output voltages of all the supplies to be exactly the same over relatively wide load and thermal operating ranges. Hence, the straight paralleling systems are considered to be less desirable than either the master-slave or constant current parallel systems.

It is accordingly, an object of the present invention to provide a new and improved system for controlling a plurality of parallel converters which supply d.c. current to a d.c. load.

Another object of the invention is to provide a new and improved system for regulating the current supplied by a plurality of parallel converters to a d.c. load, whereby the d.c. current derived from each of the converters is substantially the same.

An additional object of the invention is to provide a new and improved, relatively reliable system for controlling a plurality of parallel converters, each of which supplies a d.c. current to a load, whereby the current requirements of the load can still be met if any of the converters should fail.

An additional object of the invention is to provide a new and improved system for controlling a plurality of converters which are connected to supply d.c. current in parallel to a common load, wherein all of the converters operate in the same manner to supply approximately equal currents to the load, with a high degree of voltage regulation.

A further object of the invention is to provide a new and improved system for controlling a plurality of parallel converters which supply a d.c. current to a common load, wherein the converters can have different characteristics and be connected to the load via cables having different lengths.

Still an additional object of the invention is to provide a new and improved system for controlling a plurality of parallel power converters that supply approximately equal currents to a common load, wherein different power supplies function relatively independent of each other so there is no interaction between them.

A further object of the invention is to provide a new and improved system for controlling a plurality of parallel converters which supply d.c. current to a common load, wherein current limiting and over-voltage protection operations in each individual supply are not hindered because of the system interconnections.

Still an additional object of the invention is to provide a new and improved, relatively economical and reliable system for controlling the d.c. power supplied by a plurality of converters to a common load wherein the system utilizes relatively low cost and low power components, and does not require any high power devices that are subject to stresses that easily cause failure.

DISCLOSURE OF THE INVENTION

In accordance with the present invention, the foregoing objects are achieved and the disadvantages of the prior art are overcome by utilizing a single controller that is responsive to the voltage across a load that is driven in parallel by the d.c. current flowing from each of a plurality of conventional parallel converters. The single controller functions in combination with a controller included in each of the conventional, prior art converters. The common controller compares the d.c. load voltage with a d.c. reference voltage that is adjusted to equal a set point for the load voltage. The comparison yields an error signal indicative of the deviation of the reference voltage from the d.c. load voltage. The error signal controls a variable d.c. impedance that is connected in parallel across sense input terminals of the controllers conventionally included in the prior art converters.

The sense input terminals of a particular converter are also connected to output terminals of the particular converter through a relatively low impedance. The impedance of the common controller, connected to the remote sense input terminals of the controller in each of the converters, functions as a variable impedance of a voltage divider that includes impedances connected to the output terminals of the particular supply to control the voltage supplied to one input of a comparator within the controller of each converter. The other input to the controller of each converter is responsive to a reference voltage. Because conventional converters are used, each includes a different reference voltage source and each controller of each individual converter varies the d.c. current derived by the particular converter by controlling the chopper pulse width.

The present invention thus differs from the prior art by utilizing a single common controller having only low power and relatively inexpensive components. The single controller derives an error signal to control the impedance across the remote sense input terminals of the conventional prior art converters. The invention thus obviates the need for a master converter, including a.c. to d.c. to a.c. to d.c. conversion steps which are subject to failure because of high current requirements. Each of the converters of the invention functions in the same manner in response to variations of a single variable impedance that is responsive to the common controller, whereby each of the supplies delivers approximately the same current to the load. The common controller is responsive to the load voltage, to derive a single error voltage that controls all of the converters. In contrast, in the straight parallel systems of the prior art, the controller in each individual supply is responsive exclusively to the output voltage of that supply. Hence, in the present invention, if the different converters have differing characteristics or if the cables connecting the output terminals of the individual converters and the load have differing lengths or impedances, the current and voltage supplied by each of the converters to the load are approximately equalized.

While we are aware that U.S. Pat. Nos. 3,001,082 and 4,039,925 disclose prior art parallel converters which drive a common d.c. load, the systems disclosed in these patents are not believed adaptable to modern converters having internal controllers for the current supplied to a parallel load. In the system disclosed in U.S. Pat. No. 4,039,925, the load voltage is compared with a reference to derive a signal. The signal is applied in parallel to directly control the width of chopped pulses in a d.c. to a.c. to d.c. converter.

Because the converter is of the d.c. to a.c. to d.c. type, rather than of the a.c. to d.c. to a.c. to d.c. type, it is necessary to have the choppers synchronized together. Therefore, commercially available devices utilizing a controller for the chopper in each individual converter cannot be employed. In the presently available a.c. to d.c. to a.c. to d.c. converters, it is not necessary to have the choppers of the parallel converters synchronized with each other because of the isolation provided by the full wave rectifier and filter between the a.c. power source and the input terminals of the chopper. In d.c. to a.c. to d.c. systems, a low frequency beat can be derived as a result of interaction between the choppers; this low frequency beat can be coupled through the filters and reflected as an a.c. component in the load. The relatively high reflected impedance of the full wave rectifiers directly responsive to the a.c. source does not enable this to occur in the commercially available devices.

In U.S. Pat. No. 3,001,082, an error voltage is developed by a common controller in response to the load voltage and a single reference. The error voltage directly controls the impedance of a regulator connected between output terminals of a filter of a full wave rectifier and the load. Hence, in the system disclosed in U.S. Pat. No. 3,001,082, there is no disclosure of a common variable impedance that is responsive to the load voltage, and which controls a plurality of individual controllers in the parallel converters, wherein the controllers in each of the converters are all directly responsive to the output voltage of the particular converter.

Generalizing, the circuit of the present invention controls the d.c. current supplied by each of a plurality of parallel converters or power supplies ($P_1 \ldots P_k \ldots P_n$, where n is an integer greater than 1 and k is selectively every integer from 1 to n) to a common d.c. load so that substantially the same d.c. current and d.c. voltage are supplied by each power supply to the load. Power supply $P_k$ includes power output terminal means connected to supply the d.c. current derived from supply $P_k$ to the d.c. load. A controller in supply $P_k$, for the amplitude of the d.c. current supplied by supply $P_k$ to the load, includes remote sense input terminal means across which a d.c. input voltage for the controller is derived. D. C. impedance means are connected in series between the power output terminals of power supply $P_k$. A first comparison circuit, in the controller of supply $P_k$, is connected to be responsive to a first reference voltage and the voltage across the remote sense input terminal means of the controller of supply $P_k$. The first comparison circuit, in the controller of supply $P_k$, derives a first error signal having a magnitude indicative of the deviation of the first reference voltage from the voltage across the remote sense terminal means of supply $P_k$. The amplitude of the d.c. current supplied by power supply $P_k$ to the load is controlled in response to the first error signal derived by the controller of supply $P_k$. Such a controller is typically part of a conventional, prior art power converter responsive to an a.c. source and which drives a d.c. load.

In accordance with the invention, a second comparison circuit, connected to be responsive to the d.c. voltage across the load, responds to a second source of d.c. reference voltage and the d.c. load voltage to derive a second error signal indicative of the deviation of the second reference voltage from the d.c. load voltage. The value of a variable d.c. impedance is controlled by the amplitude of the second error signal. The variable impedance has terminals connected in parallel across the sense input terminal means of the controllers of supplies $P_l \ldots P_k \ldots P_n$. Thereby, the voltage across the remote sense input terminal means of the controller in converter $P_k$ is varied in response to the current flowing to the remote sense terminal means of the controller for supply $P_k$ from the load terminal means of supply $P_k$ and the variable impedance causes the current supplied by power supply $P_k$ to the load to be approximately equal to the current supplied to each of the power supplies $P_1 \ldots P_k \ldots P_n$.

It is, accordingly, an additional object of the invention to provide a new and improved system for controlling a plurality of conventional, prior art a.c. to d.c. to a.c. to d.c. converters, each of which includes a chopper having a controller for the width of pulses derived from the chopper.

Another feature of the invention is that a single margining circuit can be utilized, and connections in each of the converters need not be made to a margining circuit in the particular converter. In the prior art, margining circuits have been utilized to enable step wise, relatively small percentage adjustments to be made in the output voltage in each converter. In the prior art parallel systems, it has been generally necessary to control the margining circuits in each power supply on an individual basis. Individual adjustments of the margining circuits has deleterious effects because of the time required and because of the possibility of errors in attaining the desired, proper level for the step wise adjustment.

In accordance with a further feature of the invention, the common controller includes margining circuitry which is common to all of the converters. Thereby, the need for individual adjustments to the margining circuits is obviated. In addition, it is possible to eliminate the margining circuits from the conventional prior art converters if the manufacturer is sure that the converter is to be utilized in connection with the controller of the present invention.

It is, accordingly, a further object of the invention to provide a new and improved system wherein a common d.c. load is driven in parallel by a plurality of converters, and wherein all of the converters are supplied by a common controller having a single margining circuit.

The above and still further objects, features and advantages of the present invention will become apparent upon consideration of the following detailed description of one specific embodiment thereof, especially when taken in conjunction with the accompanying drawing.

BEST MODE FOR CARRYING OUT THE INVENTION

Figure 1:
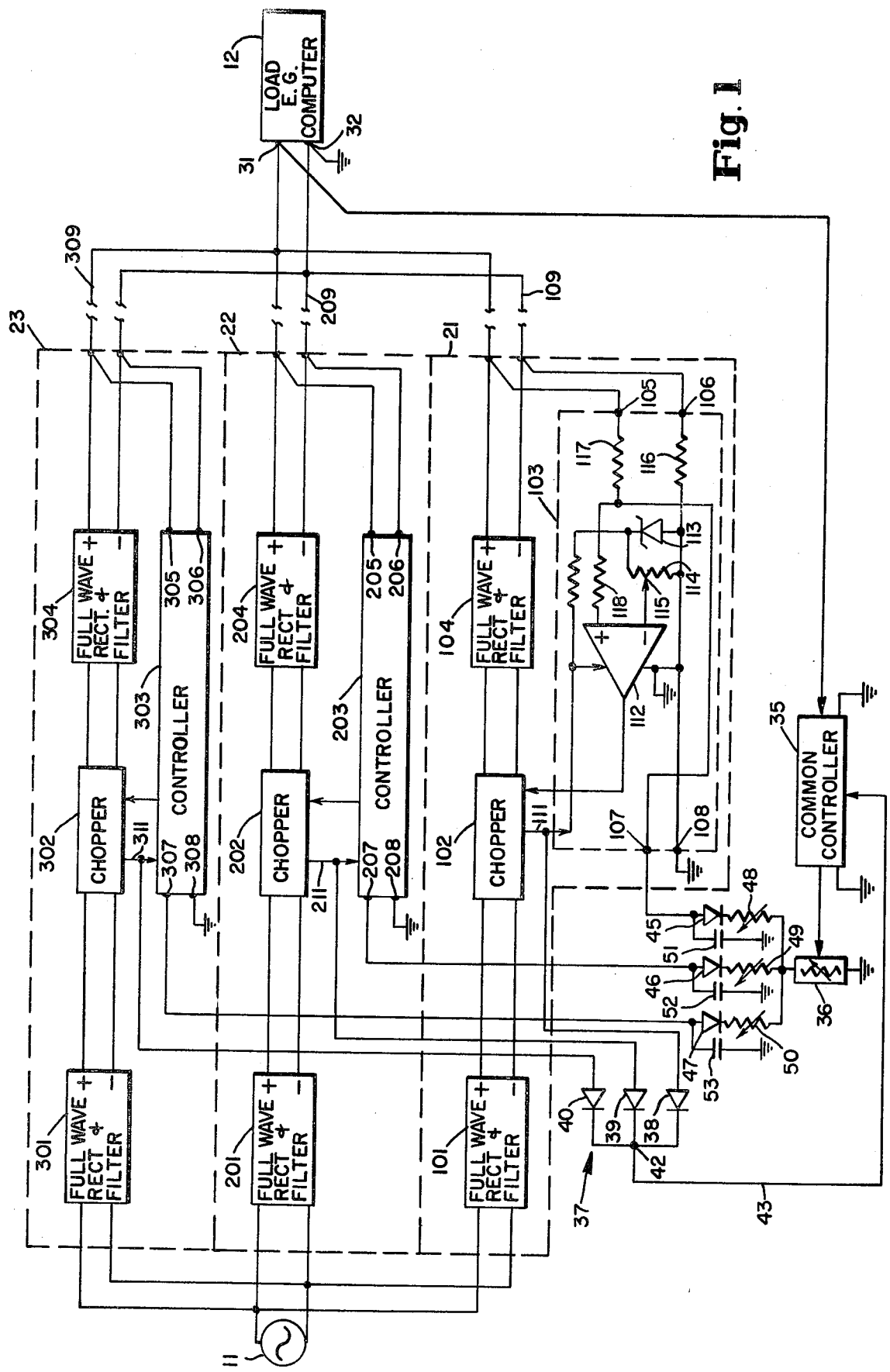
FIG. 1 is a partial-block, and partial circuit diagram of a preferred embodiment of the present invention.

Reference is now made to FIG. 1 of the drawing wherein a.c. power source 11 supplies power to d.c. load 12 by way of three parallel a.c. to d.c. to a.c. to d.c. converters 21, 22 and 23. In one typical embodiment, a.c. source 11 is a 110 volt, 60 Hz. power line, while load 12 is a computer having a 5 volt requirement, at 200–300 amperes. Each of converters 21–23 is substantially the same, being capable of supplying up to 100 amperes, at 5 volts, to load 12. To simplify the description, the components of converter 21 are described in detail; corresponding components of converters 21, 22 and 23 are provided with reference numerals that are respectively 100, 200 and 300.

Converter 21 includes a full wave rectifier and low-pass filter 101 directly responsive to a.c. source 11; rectifier and filter 101 derives a d.c. full wave rectifier voltage (typically approximately 150 volts) that is applied to a chopper 102 which derives a relatively high frequency, e.g. 20 kHz., output. The pulse width and duty cycle, but not amplitude, of the pulse output of chopper 102 are controlled in response to an output signal of controller 103. The pulse output of chopper 102 is applied to full wave rectifier and filter 104, which derives up to 100 amperes at an output voltage of approximately 5 volts. The amplitude of the current derived from full wave rectifier and filter 104 is controlled by the duty cycle of the pulse output of chopper 102. Controller 103 includes input terminals 105 and 106 connected directly to the output terminals of full wave rectifier and filter 104 to assist in controlling the amplitude of the control signal applied by the controller to chopper 102. In addition, controller 103 includes remote sense input terminals 107 and 108, respectively responsive to a d.c. control level and ground voltage.

The output terminals of converters 21, 22 and 23, at the outputs of full wave rectifiers and filters 104, 204 and 304, are connected to load 12 via cables 109, 209 and 309, respectively. Cables 109, 209 and 309 can have differing lengths and impedance differences of up to 5:1; for example, the impedances of cables 109, 209 and 309 can, in typical situations, be anywhere from 0.005 to 0.0025 ohms. The ends of cables 109, 209 and 309 remote from converters 21, 22 and 23 are connected directly to plus 5 volt and ground terminals 31 and 32 of load 12.

Controller 103 responds to the voltages applied to input terminals 105–108 thereof to supply a control input signal to a pulse width modulator included in chopper 102. Basically, controller 103 compares the voltage applied to remote sense input terminals 107 and 108 with a reference voltage. Controller 103 is powered, with relatively low current, logic level voltage by the pulse width modulator logic circuitry included within chopper 102. Typically the power requirements of controller 103 are 12–20 volts, in the milliampere range, as derived by output lead 111 of chopper 102.

The current is applied by lead 111 in parallel to operational amplifier 112 and to shunt Zener diode 113 which develops a regulated d.c. voltage of 6.5 volts. Zener diode 113 is shunted by potentiometer 114, having a slider 115 from which is derived a reference voltage that is slightly lower than the desired voltage between load terminals 31 and 32; for example, if the desired load voltage is 5 volts, slider 115 is adjusted so that the voltage between it and ground terminal 108 is 4.75 volts.

The reference voltage at slider 115 is supplied to an inverting input of operational amplifier 112, which functions as a comparator and differential amplifier. The grounded ends of potentiometer 114 and Zener diode 113 are connected to input terminal 106, at the low voltage end of full wave rectifier and filter 104, via resistor 116, typically having a value of 15–75 ohms; in a preferred embodiment, resistor 116 has a value of 27 ohms. The non-inverting (+) input of operational amplifier 112 is responsive to the voltage at terminal 105 and a signal at terminal 107. In particular, terminal 105 is connected to terminal 107 via resistor 117, also having a value of 27 ohms in the preferred embodiment. A common point between terminal 107 and resistor 117 is connected to the non-inverting input of amplifier 112 by way of current limiting input resistor 118, typically having a value of 2 kilohms. Operational amplifier 112 responds to the signals applied to its inverting and non-inverting input terminals to derive a difference, error signal that is applied to the pulse width control input of chopper 102.

The system as described is conventional and employed extensively in the prior art. In general, any number of parallel converters can be employed and three converters are illustrated for descriptive purposes. Generalizing, n converters, $P_1 \ldots P_k \ldots P_n$ are employed and each preferably supplies an equal current and voltage to load 12 in response to a.c. power from source 11.

In accordance with the present invention, common controller 35 responds to the voltage across load terminals 31 and 32, to derive a control signal for variable impedance 36 that is shunted across input terminals 107, 207 and 307 of controllers 103, 203 and 303, respectively. Controller 35 compares the voltage between load terminals 31 and 32 with a reference, d.c. voltage, set to the same magnitude as the desired set point across load terminals 31 and 32. Controller 35 compares the reference voltage with the load voltage to derive an error signal which controls the magnitude of variable resistive impedance 36. Controller 35 is powered by the voltage on logic output leads 111, 211 and 311 of choppers 102, 202 and 302, respectively. The voltages on leads 111, 211 and 311 are combined in OR gate 37, including diodes 38, 39 and 40. The anodes of diodes 38, 39 and 40 are respectively connected to leads 111, 211 and 311, while the cathodes of the leads are connected to common terminal 42 that is connected by lead 43 to the power input of common controller 35. Thereby, if any of power supplies 21, 22 or 23 should fail, the power for controller 35 does not fail.

Variable resistive impedance 36 provides a common load for terminals 107 and 108, 207 and 208, and 307 and 308 of controllers 103, 203 and 303, respectively. To this end, one end of a variable resistive impedance 36 is grounded, and hence connected to each of terminals 108, 208 and 308. The other end of variable impedance 36 is respectively connected to terminals 107, 207 and 307 via isolating diodes 45, 46 and 47. The cathodes of diodes 45, 46 and 47 are respectively connected to variable impedance 36 via resistors 48, 49 and 50. The values of variable resistors 48–50 are adjusted as a function of the length of cables 109, 209 and 309, respectively, to maintain the current supplied by each of converters 21, 22 and 23 to load 12 substantially equal or balanced. The anodes of diodes 45, 46 and 47 are connected to filter capacitors 52, 53 and 54, respectively, and to input terminals 107, 207 and 307 of controllers 103, 203 and 303. In a typical embodiment, each of variable resistors 48, 49 and 50 has a maximum value of 75 ohms to compensate for the differences in the lengths of cables 109, 209 and 309.

Figure 2:
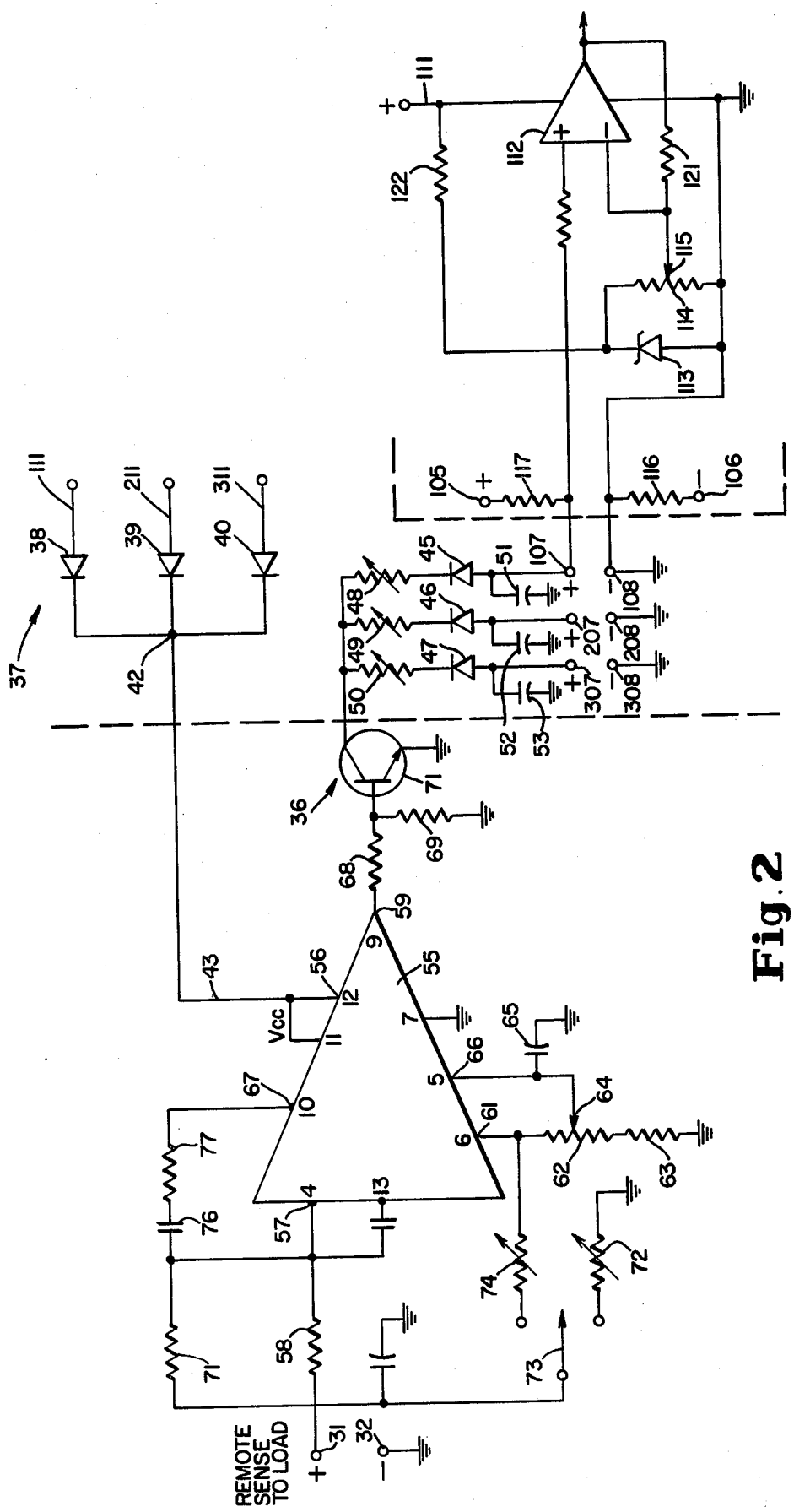
FIG. 2 is a circuit diagram of the common controller and a portion of the individual converter controllers in the system of FIG. 1.

Reference is now made to FIG. 2 of the drawing wherein details of common controller 34, variable resistance impedance 36, and the circuits connected to them are illustrated in greater detail. Common controller 35 includes operational amplifier 55 having power input terminals 56 connected to be responsive to the d.c. voltage supplied by terminal 42 to lead 43. Amplifier 55 includes an inverting input terminal 57 connected to load terminal 31 via input resistor 58. Amplifier 55 also includes an output signal terminal 59, as well as a power supply output terminal 61 from which is derived a d.c. voltage, such as 7.2 volts. Terminal 61 is connected to ground through potentiometer 62 and series resistor 63. Potentiometer 62 includes a slider 64 shunted by filter capacitor 65 and connected to supply a reference d.c. voltage to terminal 66 of amplifier 55. Slider 64 is adjusted so the voltage supplied to terminal 66 equals the set point voltage for load terminals 31 and 32. Amplifier 55 responds to the voltages at terminals 31 and 66 to derive an error signal at output terminal 59 that equals the difference between the voltages at terminal 31 and slider 64. Amplifier 55 includes a further output terminal 67, internally coupled within the amplifier to output terminal 59 by a Zener diode so that the voltage at terminal 67 follows the voltage at terminal 59, and is displaced from it by a predetermined d.c. level; for example, if the voltage at the amplifier output terminal 59 is 0 volts, the voltage at terminal 67 is +3 volts. In one typical embodiment, amplifier 55 is an LM 723 used as a d.c. operational amplifier. the d.c. voltage at terminal 59 controls variable impedance 36 via a resistive voltage divider including resistors 68 and 69, connected in series between terminal 59 and ground. In a preferred embodiment, variable resistive impedance 36 is an NPN bipolar transistor 71 having a base electrode connected to the tap between resistors 68 and 69. Transistor 71 has a variable, resistive impedance emitter collector path; the emitter thereof is connected directly to ground and its collector is connected in parallel to variable resistors 48–50. Thereby, the variable emitter collector impedance of transistor 71 provides variable loading for terminals 107 and 108, 207 and 208, as well as 307 and 308.

The variable loading across terminals 107 and 108 provided by the emitter collector path of transistor 71, as well as the series circuit including diode 45 and resistor 48, provides a voltage dividing effect for the voltages between output terminals or studs 105 and 106, which are series connected by resistors 117 and 116 to terminals 107 and 108. The variable impedance between terminals 107 and 108 is reflected as a variable voltage across these terminals, which variable voltage is coupled between the non-inverting input of amplifier 112 and ground. The variable voltage coupled to the non-inverting input of amplifier 112 is compared with the reference voltage at slider 115, whereby amplifier 112 derives an error signal that controls the pulse width and duty cycle of pulses derived from chopper 102.

As illustrated in FIG. 2, differential amplifier 112 is actually an operational amplifier having a feedback resistor 121 connected between the amplifier output and inverting input terminals. In addition, Zener diode 113 is connected to the d.c. power supply voltage on lead 111 via current limiting resistor 122.

A further feature of the invention is that controller 35 includes a common margining circuit for each of converters 21–23. The common margining circuit enables the voltage supplied by all of the converters to be adjusted in a positive or negative step wise manner relative to the normal, nominal output voltage of each converter. Typically, the margining circuit in controller 35 enables the output voltages of converters 21, 22 and 23 to be varied by ±5%. In effect, the margining circuit selectively increases or decreases the reference voltage in the common controller 35 against which the voltage across load terminals 31 and 32 is compared. However, instead of increasing or decreasing the reference voltage directly, the level of the input voltage to controller 35 from terminals 31 and 32 is varied in positive and negative step wise directions to provide for negative and positive step wise increases in the output voltages of converters 21, 22 and 23.

To these ends, the voltage applied to inverting input terminal 57 of operational amplifier 55, FIG. 2, is increased or decreased in a step wise manner. To increase the output voltage of converters 21, 22 and 23, the voltage at terminal 57 is decreased by shunting terminal 57 to ground through resistor 71, selectively series connected to variable resistor 72 through single pole double throw switch 73. Switch 73 is adjusted so resistors 71 and 72 are connected in series with each other. One end of resistor 72 is connected to ground; the value of the resistor is adjusted to provide the desired degree of negative margining. To provide for positive margining, terminal 57 is connected in series with resistor 71 and variable resistor 74 by single pole double throw switch 73. One terminal of resistor 74 is connected to the positive d.c. voltage derived at terminal 61 of operational amplifier 55. The value of resistor 74 is adjusted by an amount required for positive margining. If margining is not utilized, single pole double throw switch 73 is not connected to either of variable resistors 72 or 74, but has a neutral position so that terminal 57 has no shunt path. Under all circumstances, terminal 57 is connected to output terminal 67 of operational amplifier 55 by way of a series circuit including capacitor 76 and resistor 77, which provide stabilization for a.c. gain roll off of the operational amplifier.

While there has been described and illustrated one specific embodiment of the invention, it will be clear that variations in the details of the embodiment specifically illustrated and described may be made without departing from the true spirit and scope of the invention as defined in the appended claims.

We claim:

1. In combination,
   I. a plurality of power supplies, $P_1 \ldots P_k \ldots P_n$, where n is an integer greater than 1 and k is selectively $1 \ldots n$, supply $P_k$ being responsive to an a.c. source and supplying a d.c. current to a common d.c. load for the power supplies; supply $P_k$ including:
   (1) power output terminal means connected to supply the d.c. current to the d.c. load;
   (2) a controller for the amplitude of the d.c. current supplied by the power output terminal means of power supply $P_k$ to the load, said controller including:
      (i) remote sense input terminal means across which a d.c. input voltage for the controller is derived;
      (ii) d.c. impedance means connected in series with the power output terminals of power supply $P_k$;
      (iii) a first source of d.c. reference voltage;
      (iv) a first comparison circuit connected to be responsive to the first reference voltage and the voltage across the remote sense input terminal means of supply $P_k$ for deriving a first error signal having a magnitude indicative of the deviation of the first reference voltage from the voltage across the remote sense terminal means of supply $P_k$; and
      (v) means responsive to the first error signal for controlling the amplitude of the d.c. current supplied by power supply $P_k$ to the load;
   II. a second source of d.c. reference voltage;
   III. a second comparison circuit connected to be responsive to the d.c. voltage across the load and the voltage of the second source for deriving a second error signal indicative of the deviation of the second reference voltage from the d.c. load voltage; and
   IV. a variable d.c. impedance connected so its value is responsive to the amplitude of the second error signal, said variable impedance having terminals connected in parallel across the sense input terminal means of the controllers of power supplies $P_1 \ldots P_k \ldots P_n$, whereby a voltage is developed across the remote sense input terminal means of the controller for supply $P_k$ in response to the current flowing to the remote sense terminal means of the controller for supply $P_k$ from the load terminal means of supply $P_k$ and the variable impedance, said developed voltage causing the current supplied by power supply $P_k$ to the load to be approximately equal to the current supplied by each of power supplies $P_1 \ldots P_n$.

2. The circuit of claim 1 wherein the second reference voltage is set to a desired voltage for the load and the first reference voltage is set to a value lower than the second reference voltage.

3. The circuit of claim 1 or 2 further including a circuit for step wise adjusting the effective value of the second source of d.c. reference voltage.

4. The circuit of claim 3 wherein each of the power supplies is responsive to a common a.c. source, power supply $P_k$ including: a rectifier responsive to the a.c. source for deriving a rectified d.c. voltage, means for chopping the rectified d.c. voltage at a frequency much higher than the frequency of the a.c. source, said means for controlling the amplitude of the current supplied by power supply $P_k$ including means for varying the width of pulses derived by the chopping means, and means for rectifying the pulses to derive the d.c. voltage applied to the output terminal means of supply $P_k$.

5. The circuit of claim 3 wherein the circuit for adjusting includes means for modifying the d.c. level applied by the load terminal means to the second comparison circuit.

6. The circuit of claim 5 wherein each of the power supplies is responsive to a common a.c. source, power supply $P_k$ including: a rectifier responsive to the a.c. source for deriving rectified d.c. voltage at a frequency much higher than the frequency of the a.c. source, said means for controlling the amplitude of the current supplied by power supply $P_k$ including means for varying the width of pulses derived by the chopping means, and means for rectifying the pulses to derive the d.c. voltage applied to the output terminal means of supply $P_k$.

7. The circuit of claim 1 or 2 further including a circuit for step wise adjusting the effective value of the second source of d.c. reference voltage in the positive and negative directions.

8. The circuit of claim 7 wherein the circuit for adjusting includes means for modifying the d.c. level applied by the load terminal means to the second comparison circuit.

9. The circuit of claim 8 wherein the means for modifying includes a reference voltage source connected to the load terminal means by a variable resistor.

10. The circuit of claim 9 wherein the reference voltage source included in the means for modifying is at ground potential.

11. The circuit of claim 9 wherein the reference voltage included in the means for modifying is at a potential different from ground.

12. The circuit of claim 1 or 2 wherein each of the power supplies is responsive to a common a.c. source, power supply $P_k$ including: a rectifier responsive to the a.c. source for deriving a rectified d.c. voltage, means for chopping the rectified d.c. voltage at a frequency much higher than the frequency of the a.c. source, said means for controlling the amplitude of the current supplied by power supply $P_k$ including means for varying the width of pulses derived by the chopping means, and means for rectifying the pulses to derive the d.c. voltage applied to the output terminal means of supply $P_k$.

13. The circuit of claim 1 wherein the variable impedance comprises a transistor having a control electrode responsive to the second error signal, said transistor having a variable impedance path between a pair of transistor output terminals connected in series with the remote sense terminals of the controller of supply $P_k$.

14. The circuit of claim 13 further including n blocking diodes $D_1 \ldots D_k \ldots D_n$, diode $D_k$ being connected in series circuit with the remote sense terminal means of the controller for supply $P_k$ and the output terminals of the variable impedance diode $D_k$ being poled so that it is forward biased for current flowing through it from the remote sense terminal means of the controller for supply $P_k$ and reverse biased for current flowing into the variable impedance output terminals from the remote sense terminal means of the controllers for the other supplies $P_l \ldots P_n$.

15. A circuit for controlling the d.c. current supplied by each of a plurality of parallel power supplies $P_l \ldots P_k \ldots P_n$, to a common d.c. load so that substantially the same d.c. current and d.c. voltage are supplied by each power supply to the load; supply $P_k$ including:
  (1) power output terminal means connected to supply the d.c. current to the d.c. load;
  (2) a controller for the amplitude of the d.c. current supplied by the power output terminal means of powr supply $P_k$ to the load, said controller including:
    (i) remote sense input terminal means across which a d.c. input voltage for the controller is derived;
    (ii) d.c. impedance means connected in series with the power output terminals of power supply $P_k$;
    (iii) a first source of d.c. reference voltage;
    (iv) a first comparison circuit connected to be responsive to the first reference voltage and the voltage across the remote sense input terminal means of supply $P_k$ for deriving a first error signal having a magnitude indicative of the deviation of the first reference voltage from the voltage across the remote sense terminal means of supply $P_k$;
    (v) means responsive to the first error signal for controlling the amplitude of the d.c. current supplied by power supply $P_k$ to the load;
  (3) the controlling circuit comprising:
    (i) a second source of d.c. reference voltage;
    (ii) a second comparison circuit connected to be responsive to the d.c. voltage across the load and the voltage of the second source for deriving a second error signal indicative of the deviation of the second reference voltage from the d.c. load voltage;
    (iii) a variable d.c. impedance connected so its value is responsive to the amplitude of the second error signal, said impedance having terminals connected in parallel across the sense input terminal means of the controllers of power supplies $P_l \ldots P_k \ldots P_n$, whereby a voltage is developed across the remote sense input terminal means of the controller for supply $P_k$ in response to the current flowing to the remote sense terminal means of the controller for supply $P_k$ and the variable impedance; the developed voltage causing the current supplied by power supply $P_k$ to the load to be approximately equal to the current supplied by each of power supplies $P_l \ldots P_n$.

16. The circuit of claim 15 wherein the variable impedance comprises a transistor having a control electrode responsive to the second error signal, said transistor having a variable impedance path between a pair of transistor output terminals connected in series with the remote sense terminals of the controller of supply $P_k$.

17. The circuit of claim 16 further including n blocking diodes $D_1 \ldots D_k \ldots D_n$, diode $D_k$ being connected in series circuit with the remote sense terminal means of the controller for supply $P_k$ and the output terminals of the variable impedance, diode $D_k$ being poled so that it is forward biased for current flowing through it from the remote sense terminal means of the controller for supply $P_k$ and reverse biased for current flowing into the variable impedance output terminals from the remote sense terminal means of the controllers for the other supplies $P_l \ldots P_n$.

18. The circuit of claim 15 or 16 or 17 wherein the second reference voltage is set to a desired voltage for the load and the first reference voltage is set to a value lower than the second reference voltage.

19. The circuit of claim 15 further including a circuit for step wise adjusting the effective value of the second source of d.c. reference voltage.

20. The circuit of claim 19 wherein the circuit for adjusting includes means for modifying the d.c. level applied by the load terminal means to the second comparison circuit.

21. The circuit of claim 15 further including a circuit for step wise adjusting the effective value of the second source of d.c. reference voltage in the positive and negative directions.

22. The circuit of claim 21 wherein the circuit for adjusting includes means for modifying the d.c. level applied by the load terminal means to the second comparison circuit.

23. The circuit of claim 21 wherein the means for modifying includes a reference voltage source connected to the load terminal means by a variable resistor.

24. The circuit of claim 22 wherein the reference voltage source included in the means for modifying is at ground potential.

25. The circuit of claim 22 wherein the reference voltage included in the means for modifying is at a potential different from ground.

* * * * *